(12) United States Patent
Wiegman

(10) Patent No.: US 11,515,584 B1
(45) Date of Patent: Nov. 29, 2022

(54) SYSTEMS AND METHODS FOR AIRCRAFT POWER MANAGEMENT AND DISTRIBUTION

(71) Applicant: BETA AIR, LLC, South Burlington, VT (US)

(72) Inventor: Herman Wiegman, South Burlington, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/523,479

(22) Filed: Nov. 10, 2021

(51) Int. Cl.
| | |
|---|---|
| H02M 3/00 | (2006.01) |
| B64D 27/24 | (2006.01) |
| H01M 10/48 | (2006.01) |
| H01M 10/42 | (2006.01) |
| H02M 1/00 | (2006.01) |

(52) U.S. Cl.
CPC .......... *H01M 10/482* (2013.01); *B64D 27/24* (2013.01); *H01M 10/425* (2013.01); *H02M 1/0003* (2021.05); *B64D 2221/00* (2013.01); *H01M 2010/4271* (2013.01); *H01M 2220/20* (2013.01)

(58) Field of Classification Search
CPC .. H01M 10/425; H01M 10/482; H01M 10/63; H01M 10/441; H01M 10/486; H02M 3/00; H02M 1/0045
See application file for complete search history.

(56) References Cited

U.S. PATENT DOCUMENTS

| | | | | |
|---|---|---|---|---|
| 6,166,934 A | * | 12/2000 | Kajouke | H02J 1/102 363/65 |
| 10,744,890 B2 | | 8/2020 | Long | |
| 2004/0189248 A1 | * | 9/2004 | Boskovitch | H02J 7/0048 320/116 |
| 2014/0035531 A1 | * | 2/2014 | Garnier | H02J 7/0018 320/118 |

(Continued)

FOREIGN PATENT DOCUMENTS

| | | | |
|---|---|---|---|
| CN | 104113056 B | * | 4/2016 |
| CN | 112257174 A | * | 1/2021 |

(Continued)

OTHER PUBLICATIONS

Wen-Yeau Chang; "The state of change estimating methods for batter: A review." ISRN Applied Mathematics Jul. 23, 2013 (2013).

*Primary Examiner* — Thai T Dinh
(74) *Attorney, Agent, or Firm* — Caldwell Intellectual Property Law

(57) ABSTRACT

A system for aircraft power management and distribution, including a sensor suite configured to measure battery pack data. The system includes a battery pack with a plurality of batteries and a battery monitoring component. This battery monitoring component is configured to measure battery pack data. The system also has electric power converters, each connected to a battery of the plurality of batteries. The system also includes a controller configured to control each electric power converter; receive an estimated charge from each battery; select and enable electric power converters based on the estimated charge; compare the total output of the enabled electric power converters against an optimal operating region; and adjust the number of the one or more enabled electric power converters accordingly.

15 Claims, 9 Drawing Sheets

(56) References Cited

U.S. PATENT DOCUMENTS

| | | | | |
|---|---|---|---|---|
| 2016/0241028 A1* | 8/2016 | Long | ................ | B60L 58/22 |
| 2018/0290544 A1* | 10/2018 | Long | ................ | H02M 3/337 |
| 2019/0023201 A1* | 1/2019 | Ing | ................ | H01M 10/6554 |
| 2022/0009373 A1* | 1/2022 | Patel | ................ | H02J 7/0029 |

FOREIGN PATENT DOCUMENTS

| | | | | |
|---|---|---|---|---|
| DE | 102013210293 A1 | 12/2014 | | |
| FR | 3003827 B1 | 3/2015 | | |
| WO | 2013047543 A1 | 4/2013 | | |
| WO | WO-2020240148 A2 * | 12/2020 | ........ | H01M 10/4207 |

* cited by examiner

SYSTEMS AND METHODS FOR AIRCRAFT POWER MANAGEMENT AND DISTRIBUTION

FIELD OF THE INVENTION

The present invention generally relates to the field of power management. In particular, the present invention is directed to power management and distribution in an electric aircraft.

BACKGROUND

Various components, such as computer systems, on board an electric aircraft often need a to be supplied with a low voltage. Therefore, it is sometimes necessary to covert the high voltage output of the on-board batteries to low voltage in order to supply those components with power. Additionally, these power converters only operate at peak efficiency when the output current is within a certain window. Existing solutions to not provide an adequate way of managing on-board batteries to maximize the efficiency of the power converters.

SUMMARY OF THE DISCLOSURE

In an aspect, the present disclosure is directed to a system including a sensor suite configured to measure battery pack data. The system includes a battery pack, the battery pack including a plurality of batteries electrically connected together in a series, battery monitoring component, the battery monitoring component configured to measure battery pack data, and a plurality of electric power converters, wherein each electric power converter of the plurality of electric power converters is connected to a battery in the plurality of batteries. The system also includes an electric power converter controller, the electric power converter controller configured to control each electric power converter of a plurality of electric power converters; select, from the plurality of electric power converters, one or more electric power converters to enable; enable the one of more selected electric power converters, wherein an enabled electric power converter converts an input at a first voltage level to an output at a second voltage level and the outputs of the one or more enabled electric power converters are combined to create a total output; compare the total output of the one or more enabled electric power converters against an optimal operating region, having a first threshold value and a second threshold value; and adjust, when the total output of the one or more enabled electric power converters is outside of the optimal operating region, a number of the one or more enabled electric power converters, wherein adjusting further comprises adjusting as a function of the battery pack data.

In another aspect, the present disclosure is directed to a method including measuring battery pack data for a plurality of batteries in a battery pack. The method further including selecting, from a plurality of electric power converters, wherein each electric power converter in the plurality of electric power converters is connected to a battery of the plurality of batteries, one or more electric power converters to enable. The method includes enabling the one of more selected electric power converters, comprising converting, using an electric power converter of the one or more selected electric power converters, an input at a first voltage level to an output at a second voltage level, and combining each output of the one or more enabled electric power converters to create a total output. The method includes comparing the total output of the one or more enabled electric power converters against an optimal operating region, having a first threshold value and a second threshold value. The method also includes adjusting, when the total output of the one or more enabled electric power converters is outside of the optimal operating region, a number of the one or more enabled electric power converters.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

At a high level, aspects of the present disclosure are directed to systems and methods for aircraft power management and distribution. In an embodiment, a sensor suite may measure battery pack data, the battery pack including a plurality of batteries in series, a battery monitoring component, a battery management component, and a plurality of electric power converters each connected to a battery of the plurality of batteries. This embodiment also includes an electric power converter controller that can enable and disable electric power converters based on an estimated charge state for the associated battery or batteries.

Aspects of the present disclosure can be used to manage electric power converters within a battery pack on an electric aircraft to ensure that they are operating efficiently as well as to monitor the other on-board batteries for other problems.

Aspects of the present disclosure allow the management and monitoring of an on-board battery pack with associated electric power converters. Exemplary embodiments illustrating aspects of the present disclosure are described below in the context of several specific examples.

Figure 1:
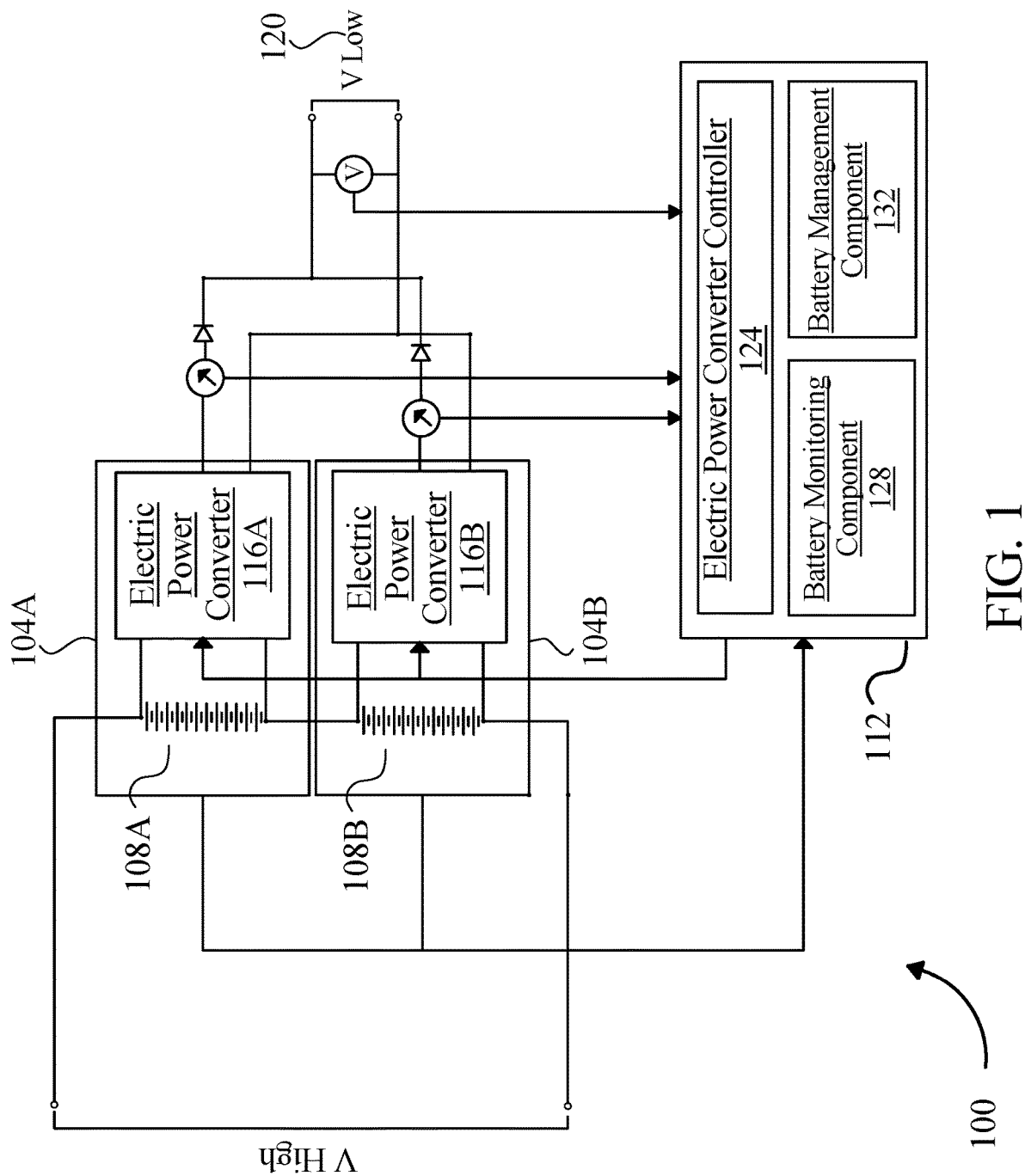
FIG. 1 is a block diagram of an embodiment of a power distribution system.

Referring to FIG. 1, FIG. 1 depicts an embodiment of power distribution system 100. In this embodiment, power distribution system 100 is depicted as including two battery systems 104A and 104B. However, in other embodiments, there may be any number of battery systems. For instance, in some embodiments, there may be 4 battery systems. In other embodiments there may be more than 4 battery systems; in yet other embodiments, there may be less than four battery systems. Battery systems 104A and 104B are electronically connected together in series. For the purposes of this disclosure, electronically connected means any connection sufficient to allow the conduction of electricity between the parts being connected.

With continued reference to FIG. 1, each battery system 104 contains a battery 108 and an electric power converter 116. Batteries 108 may include any type of energy source where chemical energy is converted into electrical energy. As a non-limiting example, batteries 108 could be lithium-ion batteries. Battery systems 104 may be enabled or disabled by the controller 112 depending on the power required by the on-board systems. In an embodiment, each of the batteries 108 may be electrically connected to its own electric power converter 116. In other embodiments, more than one battery 108 may be electronically connected in series and then connected to an electric power converter 116. Electric power converters 116 receive the voltage output of batteries 108 and convert that voltage to a low voltage (V Low) 120. The low voltage 120 is voltage required by the on-board systems. In some embodiments, the low voltage produced when all of the battery systems 104 are enabled may be the peak voltage required by the on-board systems. Thus, when one or more of the battery systems 104 are disabled, then low voltage 120 will be less than the peak voltage required by the on-board systems.

With continued reference to FIG. 1, power distribution system 100 contains controller 112. Controller 112 includes an electric power converter controller 124, and battery monitoring component 128. Power distribution system 100 may also contain battery management component 132.

With continued reference to FIG. 1, in some other embodiments, electric power converter controller 124 may use other criteria for selectively enabling and disabling electric power converters 116. In one embodiment, electric power converter controller 124 may receive a state of charge for each battery system 104, in another embodiment, electric power converter controller 124 may estimate the state of charge for each battery system 104 based on the current output of electric power converters 116a-b. In another embodiment, electric power converter controller 124 may estimate the length of time that each of electric power converters 116a-b based on the current output of each of electric power converters 116a-b. In yet another embodiment; electric power converter controller 124 may rotate through each of the electric power converters 116a-b, ensuring that each electric power converter 116a-b is enabled for the same amount of time. Electric power converter controller 124 may then use this information to decide which electric power converters 116 should be enabled or disabled in order to provide the desired low voltage 120.

Figure 2:
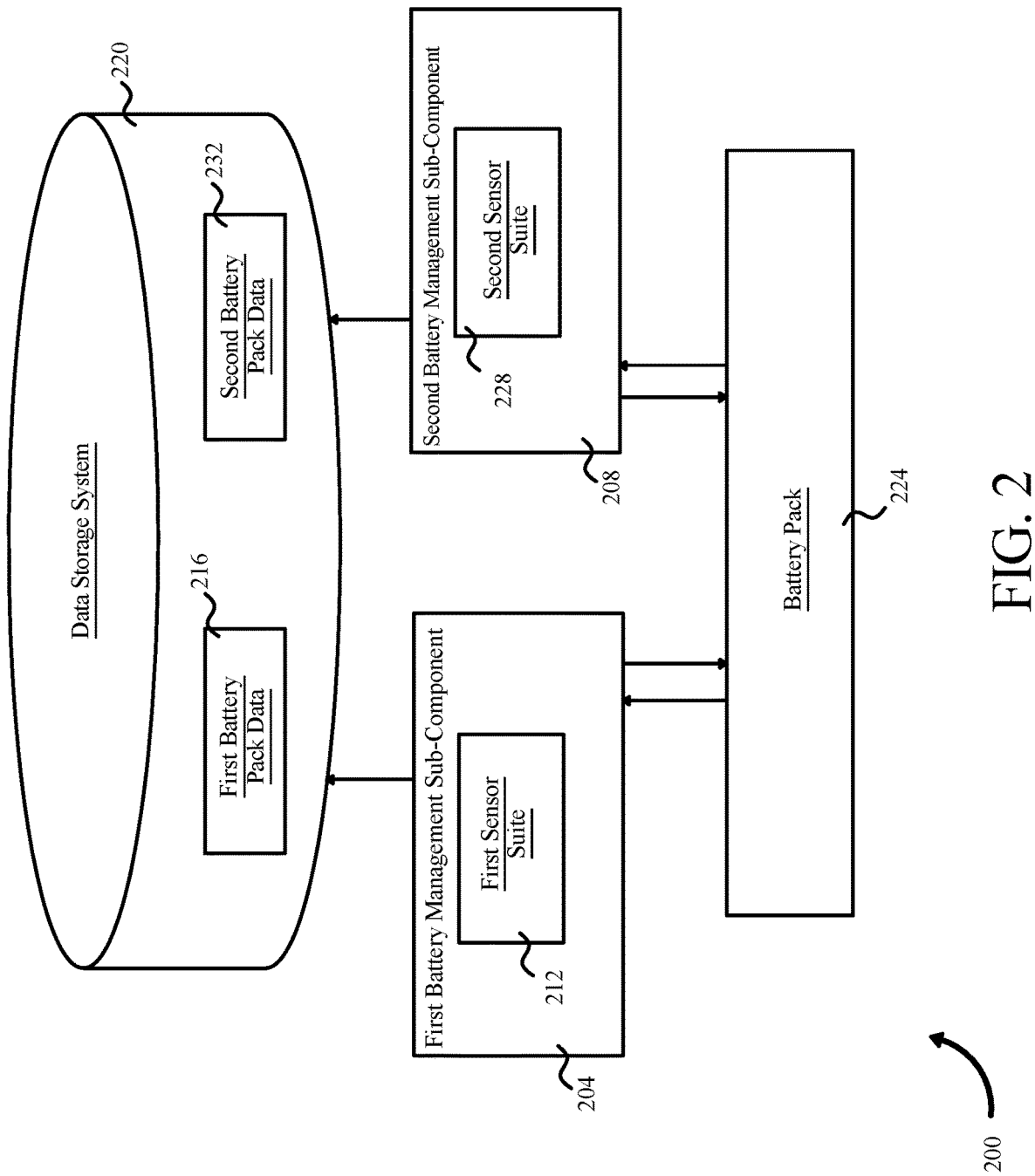
FIG. 2 is a block diagram of an exemplary battery management component.

Referring now to FIG. 2, an embodiment of battery management component 200 is presented as a block diagram. In some embodiments, battery management component 200 may be an embodiment of battery management component 132 in FIG. 1. Battery management component 200 may be integrated in a battery pack configured for use in an electric aircraft. Battery management component 200 includes first battery management sub-component 204 disposed on a first end of the battery pack. One of ordinary skill in the art will appreciate that there are various areas in and on a battery pack and/or subassemblies thereof that may include first battery management sub-component 204. First battery management sub-component 204 may take any suitable form. In a non-limiting embodiment, first battery management sub-component 204 may include a circuit board, such as a printed circuit board and/or integrated circuit board, a subassembly mechanically coupled to at least a portion of the battery pack, standalone components communicatively coupled together, or another undisclosed arrangement of components; for instance, and without limitation, a number of components of first battery management sub-component 204 may be soldered or otherwise electrically connected to a circuit board. First battery management sub-component 204 may be disposed directly over, adjacent to, facing, and/or near a battery module and specifically at least a portion of a battery cell. First battery management sub-component 204 includes first sensor suite 212. First sensor suite 212 is configured to measure, detect, sense, and transmit a first plurality of battery pack data 216 to data storage system 220. Referring again to FIG. 2, battery management component 200 includes first battery management sub-component 204. First battery management sub-component 204 is disposed in or on a second end of battery pack 224. First battery management sub-component 204 may include second sensor suite 228. Second sensor suite 228 may be consistent with the description of any sensor suite disclosed herein. Second sensor suite 228 is configured to measure second plurality of battery pack data 232. Second plurality of battery pack data 232 may be consistent with the description of any battery pack data disclosed herein. Second plurality of battery pack data 232 may additionally or alternatively include data not measured or recorded in another section of battery management component 200. Second plurality of battery pack data 232 may be communicated to additional or alternate systems to which it is communicatively coupled. Second sensor suite 228 includes a humidity sensor consistent with any humidity sensor disclosed herein, namely humidity sensor 204. Battery management component and the first and second sensor suite may be consistent with the battery management system and sensor suites, respectively, disclosed in U.S. patent application Ser. No. 17/108,798, filed on Dec. 1, 2020, entitled "Systems and Methods for a Battery Management System Integrated in a Battery Pack Configured for Use in an Electric Aircraft" and incorporated hereby by reference in its entirety.

With continued reference to FIG. 2, first battery management sub-component 204 disposed in or on battery pack 224 may be physically isolated from first battery management sub-component 204 also disposed on or in battery pack 224. "Physical isolation", for the purposes of this disclosure, refer to a first system's components, communicative coupling, and any other constituent parts, whether software or hardware, are separated from a second system's components, communicative coupling, and any other constituent parts, whether software or hardware, respectively. First battery management sub-component 204 and first battery management sub-component 208 may perform the same or different functions in battery management component 200. In a non-limiting embodiment, the first and second battery management components perform the same, and therefore redundant functions. If, for example, first battery management sub-component 204 malfunctions, in whole or in part, first battery management sub-component 208 may still be operating properly and therefore battery management component 200 may still operate and function properly for electric aircraft in which it is installed. Additionally, or alternatively, first battery management sub-component 208 may power on while first battery management sub-component 204 is malfunctioning. One of ordinary skill in the art would understand that the terms "first" and "second" do not refer to either "battery management components" as primary or secondary. In non-limiting embodiments, first battery management sub-component 204 and first battery management sub-component 208 may be powered on and operate through the same ground operations of an electric aircraft and through the same flight envelope of an electric aircraft. This does not preclude one battery management component, first battery management sub-component 204, from taking over for first battery management sub-component 208 if it were to malfunction. In non-limiting embodiments, the first and second battery management components, due to their physical isolation, may be configured to withstand malfunctions or failures in the other system and survive and operate. Provisions may be made to shield first battery management sub-component 204 from first battery management sub-component 208 other than physical location such as structures and circuit fuses. In non-limiting embodiments, first battery management sub-component 204, first battery management sub-component 208, or subcomponents thereof may be disposed on an internal component or set of components within battery pack 224.

Referring again to FIG. 2, first battery management sub-component 204 may be electrically isolated from first battery management sub-component 208. "Electrical isolation", for the purposes of this disclosure, refer to a first system's separation of components carrying electrical signals or electrical energy from a second system's components. First battery management sub-component 204 may suffer an electrical catastrophe, rendering it inoperable, and due to electrical isolation, first battery management sub-component 208 may still continue to operate and function normally, managing the battery pack of an electric aircraft. Shielding such as structural components, material selection, a combination thereof, or another undisclosed method of electrical isolation and insulation may be used, in non-limiting embodiments. For example, a rubber or other electrically insulating material component may be disposed between the electrical components of the first and second battery management components preventing electrical energy to be conducted through it, isolating the first and second battery management components from each other.

With continued reference to FIG. 2, battery management component 200 includes data storage system 220. Data storage system 220 is configured to store first plurality of battery pack data 216 and second plurality of battery pack data 232. Data storage system 220 may include a database. Data storage system 220 may include a solid-state memory or tape hard drive. Data storage system 220 may be communicatively coupled to first battery management sub-component 204 and first battery management sub-component 204 and may be configured to receive electrical signals related to physical or electrical phenomenon measured and store those electrical signals as first battery pack data 216 and second battery pack data 232, respectively. Alternatively, data storage system 220 may include more than one discrete data storage systems that are physically and electrically isolated from each other. In this non-limiting embodiment, each of first battery management sub-component 204 and first battery management sub-component 204 may store first battery pack data 216 and second battery pack data 232 separately. One of ordinary skill in the art would understand the virtually limitless arrangements of data stores with which battery management component 200 could employ to store the first and second plurality of battery pack data.

Referring again to FIG. 2, data storage system 220 stores first plurality of battery pack data 216 and second plurality of battery pack data 232. First plurality of battery pack data 216 and second plurality of battery pack data 232 may include total flight hours that battery pack 224 and/or electric aircraft have been operating. The first and second plurality of battery pack data may include total energy flowed through battery pack 224. Data storage system 220 may be communicatively coupled to sensors that detect, measure and store energy in a plurality of measurements which may include current, voltage, resistance, impedance, coulombs, watts, temperature, or a combination thereof. Additionally, or alternatively, data storage system 220 may be communicatively coupled to a sensor suite consistent with this disclosure to measure physical and/or electrical characteristics. Data storage system 220 may be configured to store first battery pack data 216 and second battery pack data 232 wherein at least a portion of the data includes battery pack maintenance history. Battery pack maintenance history may include mechanical failures and technician resolutions thereof, electrical failures and technician resolutions thereof. Additionally, battery pack maintenance history may include component failures such that the overall system still functions. Data storage system 220 may store the first and second battery pack data that includes an upper voltage threshold and lower voltage threshold consistent with this disclosure. First battery pack data 216 and second battery pack data 232 may include a moisture level threshold. The moisture level threshold may include an absolute, relative, and/or specific moisture level threshold. Battery management component 200 may be designed to the Federal Aviation Administration (FAA)'s Design Assurance Level A (DAL-A), using redundant DAL-B subsystems.

Figure 3:
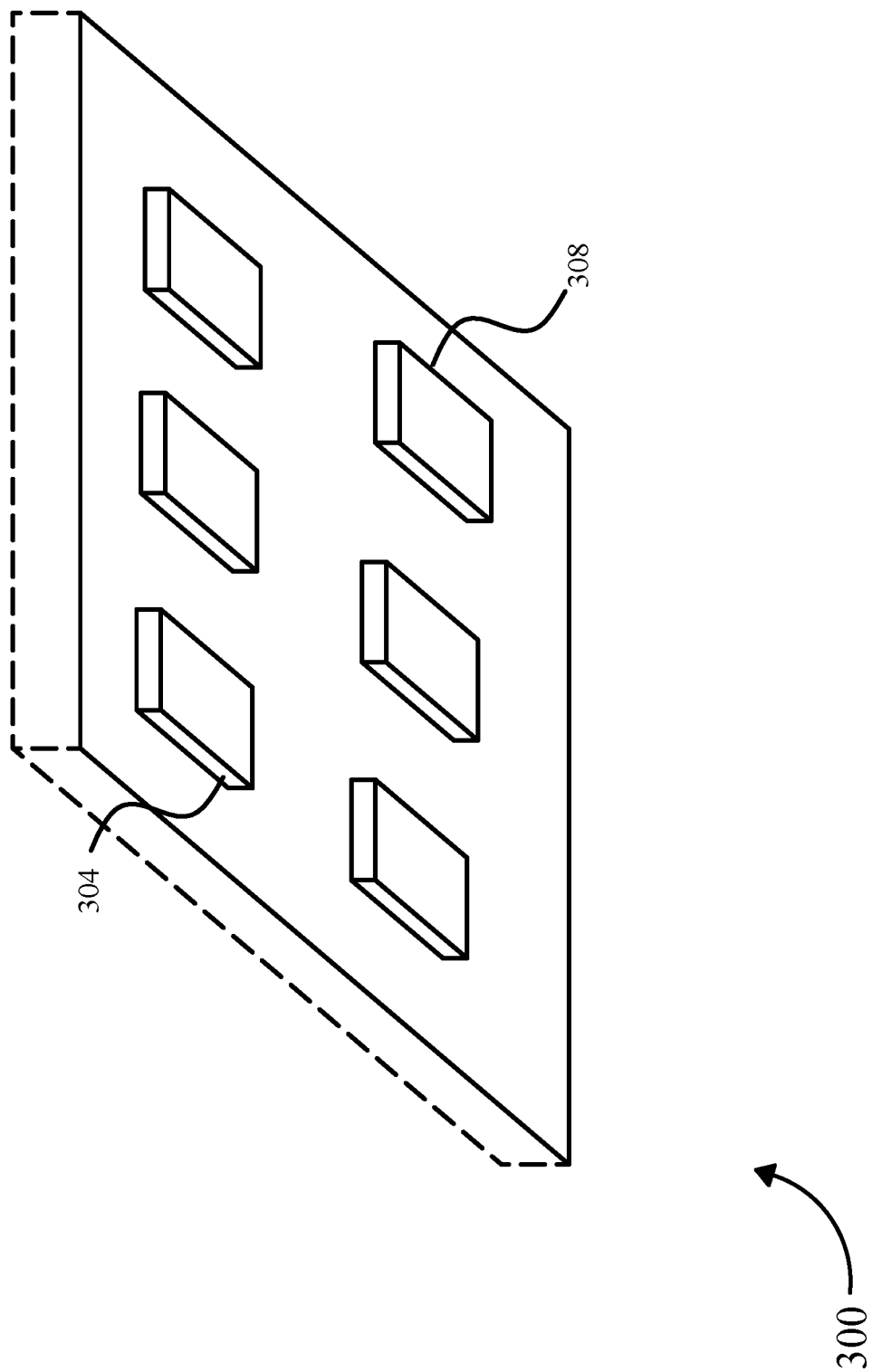
FIG. 3 is a diagram of a sensor suite.

Referring now to FIG. 3, an embodiment of sensor suite 300 is presented. Sensor suite 300 may include a plurality of independent sensors, as described herein, where any number of the described sensors may be used to measure any number of physical or electrical quantities associated with an aircraft power system or an electrical energy storage system. In some other embodiments, sensor suite 300 may comprise only a single sensor or in other embodiments, it may include a plurality of sensors of a single sensor type. Independent sensors may include separate sensors measuring physical or electrical quantities that may be powered by and/or in communication with circuits independently, where each may send sensor output to a control circuit such as a user graphical interface. In a non-limiting example, there may be four independent sensors housed in and/or on battery pack 224 measuring temperature, electrical characteristic such as voltage, amperage, resistance, or impedance, or any other parameters and/or quantities as described in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of battery management component 200 and/or user to detect phenomenon is maintained and in a non-limiting example, a user alter aircraft usage pursuant to sensor readings.

With continued reference to FIG. 3, Sensor suite 300 may be suitable for use as first sensor suite 212 and/or second sensor suite 228 as disclosed with reference to FIG. 2 hereinabove. Sensor suite 300 may include, in a non-limiting example, a humidity sensor 304. Humidity, as used in this disclosure, is the property of a gaseous medium (almost always air) to hold water in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity", for the purposes of this disclosure, is expressed as a percentage, indicating a present stat of absolute humidity relative to a maximum humidity given the same temperature. "Specific humidity", for the purposes of this disclosure, is the ratio of water vapor mass to total moist air parcel mass, where parcel is a given portion of a gaseous medium. Humidity sensor 304 may be psychrometer. Humidity sensor 304 may be a hygrometer. Humidity sensor 304 may be configured to act as or include a humidistat. A "humidistat", for the purposes of this disclosure, is a humidity-triggered switch, often used to control another electronic device. Humidity sensor 304 may use capacitance to measure relative humidity and include in itself, or as an external component, include a device to convert relative humidity measurements to absolute humidity measurements. "Capacitance", for the purposes of this disclosure, is the ability of a system to store an electric charge, in this case the system is a parcel of air which may be near, adjacent to, or above a battery cell.

With continued reference to FIG. 3, sensor suite 300 may include multimeter 308. Multimeter 308 may be configured to measure voltage across a component, electrical current through a component, and resistance of a component. Multimeter 308 may include separate sensors to measure each of the previously disclosed electrical characteristics such as voltmeter, ammeter, and ohmmeter, respectively.

Alternatively or additionally, and with continued reference to FIG. 3, sensor suite 300 may include a sensor or plurality thereof that may detect voltage and direct the charging of individual battery cells according to charge level; detection may be performed using any suitable component, set of components, and/or mechanism for direct or indirect measurement and/or detection of voltage levels, including without limitation comparators, analog to digital converters, any form of voltmeter, or the like. Sensor suite 300 may also include a sensor or a plurality thereof to detect voltage in order to determine which electric power converters 116 to activate and deactivate. Sensor suite 300 and/or a control circuit incorporated therein and/or communicatively connected thereto may be configured to adjust charge to one or more battery cells as a function of a charge level and/or a detected parameter. For instance, and without limitation, sensor suite 300 may be configured to determine that a charge level of a battery cell is high based on a detected voltage level of that battery cell or portion of the battery pack. Sensor suite 300 may alternatively or additionally detect a charge reduction event, defined for purposes of this disclosure as any temporary or permanent state of a battery cell requiring reduction or cessation of charging; a charge reduction event may include a cell being fully charged and/or a cell undergoing a physical and/or electrical process that makes continued charging at a current voltage and/or current level inadvisable due to a risk that the cell will be damaged, will overheat, or the like. Detection of a charge reduction event may include detection of a temperature, of the cell above a threshold level, detection of a voltage and/or resistance level above or below a threshold, or the like. Sensor suite 300 may include digital sensors, analog sensors, or a combination thereof. Sensor suite 300 may include digital-to-analog converters (DAC), analog-to-digital converters (ADC, A/D, A-to-D), a combination thereof, or other signal conditioning components used in transmission of a first plurality of battery pack data 216 to a destination over wireless or wired connection.

With continued reference to FIG. 3, sensor suite 300 may include thermocouples, thermistors, thermometers, passive infrared sensors, resistance temperature sensors (RTD's), semiconductor based integrated circuits (IC), a combination thereof or another undisclosed sensor type, alone or in combination. Temperature, for the purposes of this disclosure, and as would be appreciated by someone of ordinary skill in the art, is a measure of the heat energy of a system. Temperature, as measured by any number or combinations of sensors present within sensor suite 300, may be measured in Fahrenheit (° F.), Celsius (° C.), Kelvin (° K), or another scale alone or in combination. The temperature measured by sensors may comprise electrical signals which are transmitted to their appropriate destination wireless or through a wired connection.

With continued reference to FIG. 3, sensor suite 300 may include a sensor configured to detect gas that may be emitted during or after a catastrophic cell failure. "Catastrophic cell failure", for the purposes of this disclosure, refers to a malfunction of a battery cell, which may be an electrochemical cell, that renders the cell inoperable for its designed function, namely providing electrical energy to at least a portion of an electric aircraft. Byproducts of catastrophic cell failure may include gaseous discharge including oxygen, hydrogen, carbon dioxide, methane, carbon monoxide, a combination thereof, or another undisclosed gas, alone or in combination. Further the sensor configured to detect vent gas from electrochemical cells may comprise a gas detector. For the purposes of this disclosure, a "gas detector" is a device used to detect a gas is present in an area. Gas detectors, and more specifically, the gas sensor that may be used in sensor suite 300, may be configured to detect combustible, flammable, toxic, oxygen depleted, a combination thereof, or another type of gas alone or in combination. The gas sensor that may be present in sensor suite 300 may include a combustible gas, photoionization detectors, electrochemical gas sensors, ultrasonic sensors, metal-oxide-semiconductor (MOS) sensors, infrared imaging sensors, a combination thereof, or another undisclosed type of gas sensor alone or in combination. Sensor suite 300 may include sensors that are configured to detect non-gaseous byproducts of catastrophic cell failure including, in non-limiting examples, liquid chemical leaks including aqueous alkaline solution, ionomer, molten phosphoric acid, liquid electrolytes with redox shuttle and ionomer, and salt water, among others. Sensor suite 300 may include sensors that are configured to detect non-gaseous byproducts of catastrophic cell failure including, in non-limiting examples, electrical anomalies as detected by any of the previous disclosed sensors or components.

With continued reference to FIG. 3, sensor suite 300 may be configured to detect events where voltage nears an upper voltage threshold or lower voltage threshold. The upper voltage threshold may be stored in data storage system 120 for comparison with an instant measurement taken by any combination of sensors present within sensor suite 300. The upper voltage threshold may be calculated and calibrated based on factors relating to battery cell health, maintenance history, location within battery pack, designed application, and type, among others. Sensor suite 300 may measure voltage at an instant, over a period of time, or periodically. Sensor suite 300 may be configured to operate at any of these detection modes, switch between modes, or simultaneous measure in more than one mode. Battery management component 132 may detect through sensor suite 300 events where voltage nears the lower voltage threshold. The lower voltage threshold may indicate power loss to or from an individual battery cell or portion of the battery pack. Battery management component 132 may detect through sensor suite 300 events where voltage exceeds the upper and lower voltage threshold. Events where voltage exceeds the upper and lower voltage threshold may indicate battery cell failure or electrical anomalies that could lead to potentially dangerous situations for aircraft and personnel that may be present in or near its operation.

Figure 4:
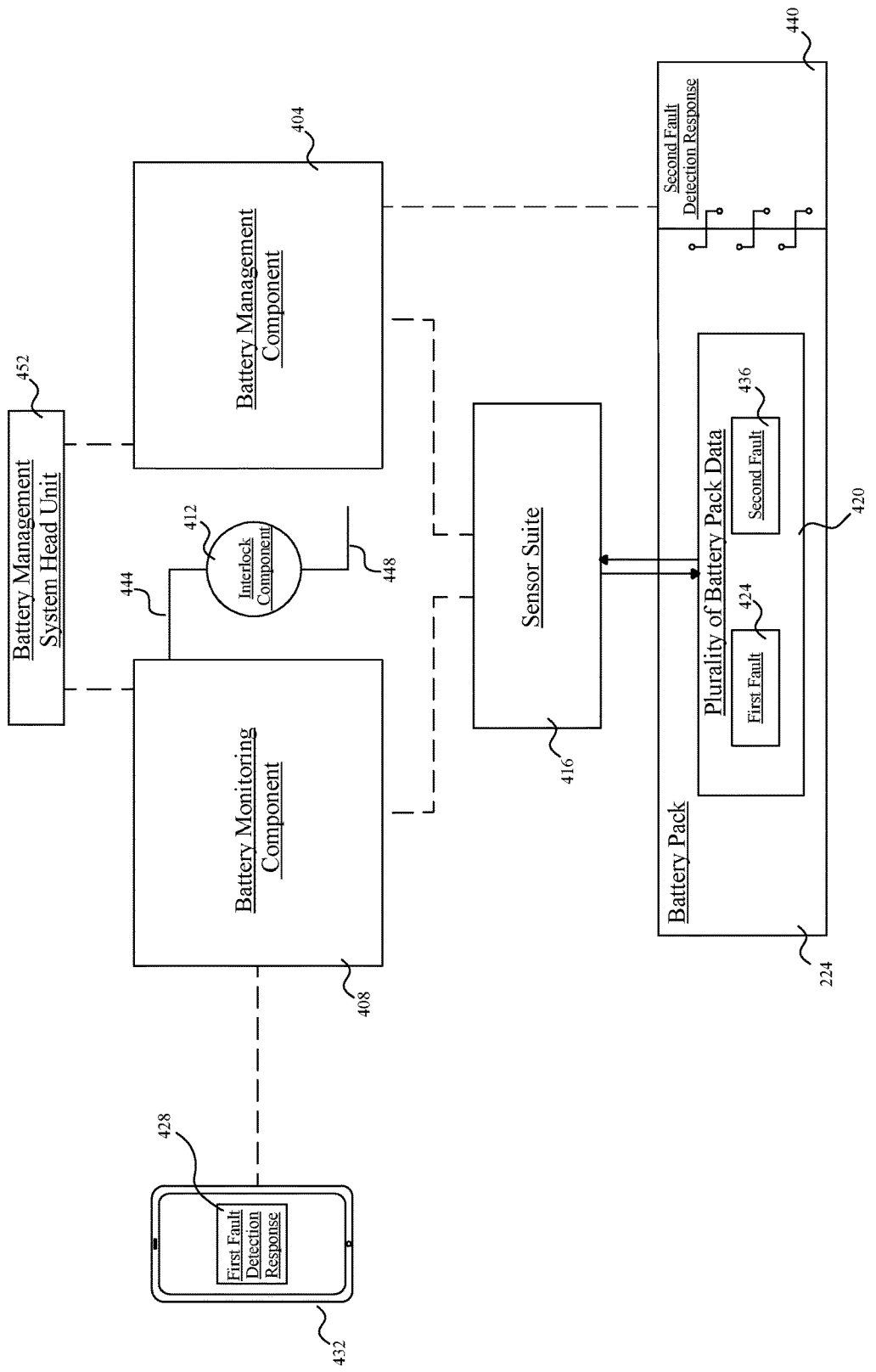
FIG. 4 is a block diagram of an embodiment of a battery monitoring and management system.

FIG. 4, depicts a block diagram of a battery management and monitoring system 400. Battery management and monitoring system 400 including battery management component 404 and battery monitoring component 408. In some embodiments, battery management and monitoring system 400 may also include interlock component 412. Battery management and monitoring system 400 is disposed on at least a portion of battery pack 224. For example, battery pack 224 may include batteries, including electrochemical battery cells, consistent with the description hereinabove. Battery management and monitoring system 400 may include more than one electrically isolated systems performing at least a portion of the same functions. Battery management and monitoring system 400 may include more than one electrically isolated systems performing redundant functions. Battery management and monitoring system 400 may include more than one electrically isolated systems performing entirely different functions. Battery management and monitoring system 400 may include more than one electrically isolated systems performing entirely separate and distinct functions. Battery management and monitoring system 400 may include one or more physically separated systems disposed on at least a distinct portion of battery pack 224 or any subcomponents thereof. Battery management and monitoring system 400 may include one or more physically isolated systems that perform at least a portion of the same functions. Battery management and monitoring system 400 may include more than one physically isolated systems performing the redundant functions. Battery management and monitoring system 400 may include more than one physically isolated systems performing entirely different functions. Battery management and monitoring system 400 may include more than one physically isolated systems performing entirely separate and distinct functions.

With continued reference to FIG. 4, battery management and monitoring system 400 may include a sensor suite 416. The sensor suite may include any sensor suite described above consistent with the disclosure, for example, first sensor suite 212 or second sensor suite 228. Sensor suite 416 is configured to measure a plurality of battery pack data 420. Plurality of battery pack data 420 may include any plurality of battery pack data described above with reference to FIG. 2, namely first plurality of battery pack data 216 and second plurality of battery pack data 232. Sensor suite 416 may include any of the sensors, grouping of sensors, or prefabricated sensor packages as described above. Sensor suite 416 may include an accelerometer. Sensor suite 416 may include a vibrometer, vibration sensor, load cell, pressure sensor, force gauge, a combination thereof, among other sensors configured to measure physical parameters like acceleration, force, vibration, pressure, and the like. Sensor suite 416 may include a voltmeter. Additionally, sensor suite 416 may include a multimeter, configured to measure electrical current, potential difference (voltage), resistance, impedance, capacitance, or other electrical parameters alone or in combination. Sensor suite 416 may include an ohmmeter, ammeter, or other separate electrical sensors. Sensor suite 416 may include a thermocouple. Additionally or alternatively, sensor suite 416 may include a thermometer, RTD, or other sensor configured to measure temperature or heat energy of a system.

With continued reference to FIG. 4, battery management and monitoring system 400 includes a battery monitoring component 408. Battery monitoring component 408 is configured to measure, as a function of plurality of battery pack data 420, first fault 424 in battery pack 224. In an embodiment, battery monitoring component 408 may use a sensor suite 416 to measure a plurality of battery pack data 420. Battery monitoring component 408 may be disposed on at least a portion of an integrated circuit board on or in battery pack 224. The integrated circuit board may be disposed in battery pack 224 proximate to battery cells or disposed on a first end of battery pack 224. First fault 424 may include an over-voltage condition of at least a portion of battery pack 224, for example, a single electrochemical battery cell over-voltage, or a portion thereof. First fault 424 may include an under-voltage condition of at least a portion of battery pack 224. First fault 424 may be characterized by a comparison, by battery monitoring component 408, of a voltage measurement from sensor suite 416, to a voltage threshold which has been predetermined or calculated by at least a user or additional system, or alternatively, input by a user. First fault 424 may include a temperature rise rate. There may be a threshold temperature rise rate or threshold temperature to which a temperature measurement by sensor suite 416 is compared by battery monitoring component 408. First fault 424 may include a detection of a resistance. This resistance may be measured by sensor suite 416 and compared to a range or threshold resistance input by a user, calculated by at least a portion of an alternate system, or a combination thereof. First fault 424 may also include a detection that the loading of electric power converter(s) 116 exceeds upper current threshold 516. First fault 424 may also include a detection that the loading of electric power converter(s) 116 falls below lower current threshold 512.

With continued reference to FIG. 4, battery monitoring component 408 produces a first fault detection response 428 upon detection of first fault 424. First fault detection response 428 may be generated in response to any of the described variations of first fault 424. This is a non-exhaustive list of possible faults that may be detected as first fault 424, one of ordinary skill in the art would understand the greater number and variation of physical, electrical, or other faults that may be detected by a sensor suite configured to measure characteristics of an electric aircraft battery pack. First fault detection response 428 includes notification of a user of the first fault 424 in battery pack 224. Battery monitoring component 408 communicates first fault detection response 428 to be displayed on graphical user interface 432. Graphical user interface (GUI) 432 may include a flight display known in the art to be disposed in at least a portion of a cockpit of an electric aircraft. GUI 432 may be disposed on a user device located remotely from the electric aircraft. GUI 432 may be disposed on a computer device located remotely or onboard the electric aircraft. GUI 432 may be disposed on a smartphone located remotely or onboard the electric aircraft. First fault detection response 428 may include a textual display. The textual display may include a warning message to a user, which may include a pilot, whether onboard or remotely located. The textual display may include a message describing the fault. Additionally, or alternatively, the textual display my include a generic message that a fault was detected. The textual display may include where the fault was located within battery pack 224. The textual display may include a suggestion for pilot or user intervention or suggested maintenance procedures. First fault detection response 428 may include an image display. The image display included in first fault detection response 428 may include a depiction of battery pack 224. The image display may include a depiction of a portion of battery pack 224. The image display may include a depiction of the portion of battery pack 224 first fault 424 was detected in. The image display may include a depiction of suggested user operations or suggested maintenance. It should be noted that battery monitoring component 408 is only capable of notifying a user of first fault 424 by first fault detection response 428.

With continued reference to FIG. 4, battery management and monitoring system 400 includes battery management component 404. Battery management component may be consistent with the description of the battery management components hereinabove, for instance, first and second battery management sub-components (204 and 208). Battery management component 404 is configured to detect, as a function of plurality of battery pack data 420, second fault 436 in battery pack 224. Second fault 436 may be characterized exactly like first fault 424. For example, second fault 436 may include an over-voltage condition or temperature rise rate. Second fault 436 may not be characterized like first fault 424. For example, second fault 436 may be an over-voltage condition and first fault 424 may be an undervoltage condition. First fault 424 and second fault 436 may be detected separately from each other, at least partially together, or at the same instant. One of ordinary skill in the art would understand first fault 424 and second fault 436 to have near limitless combinations and/or iterations thereof. First fault 424 does not necessarily need to be detected before second fault 436 chronologically, and largely depends on the active component at the time, which will be described in detail herein. Battery management component 404 is configured to produce a second fault detection response 440 upon receiving detection of second fault 436. Second fault detection response 440 is configured to mitigate second fault 436 in battery pack 224. "Mitigate", for the purposes of this disclosure, describes operations, procedures, actions, or reconfigurations with the intent to resolve an operational fault in a component of a system. In a non-limiting example, battery management component 404 may redirect current around at least a portion of battery pack 224 if second fault 436 is detected in at least a portion of battery pack 224. The mitigation would be to bypass the malfunctioning area of the battery pack, in this non-limiting example. Second fault detection response 440 may additionally include a prioritization of current to a portion of battery pack 224 that is experiencing a lack of charging to that portion, thus mitigating the charging difference within battery pack 224. Battery management component 404 may include a contactor control circuit. "Contactor control circuit", for the purposes of this disclosure, describes an electrically controlled switch used for switching an electrical power circuit, here found in battery pack 224. Typically, a contactor control circuit is controlled by a circuit which has a lower power level than the switched circuit. In some embodiments, second fault detection response may include disabling an electric power converter, for instance, electric power converter 116 with reference to FIG. 1. One of ordinary skill in the art would understand that there are a plurality of methods and systems capable of switching circuits electromechanically, like relays, and that a plurality may be used herein substituted for contactor control circuit.

With continued reference to FIG. 4, battery management and monitoring system 400 may include interlock component 412. Interlock component 412 includes a first mode 444 and a second mode 448. Interlock component 412 is configured to enable battery monitoring component 408 and disable battery management component 404 when in first mode 444. Interlock component is configured to enable battery management component 404 and disable battery monitoring component 408 when in second mode 448. One of ordinary skill in the art would understand that first mode and second mode do not refer to order of operations or chronology, but to more than one distinct mode the interlock component 412 can reconfigure itself into. One of ordinary skill in the art would appreciate from the present disclosure that battery management component 404 and battery monitoring component 408 are enabled and disabled separately. In other words, the enabling of one component does not disable the other automatedly, for example. Interlock component 412 may include a mechanical component. For example, a mechanical interlock component may include a lever, button, switch that is physically interacted with by a user, subsystem, or a combination thereof. Interlock component 412 may include an electrical component. For example, an electrical interlock component 412 may include a circuit that is completed when a certain component is to be enabled. Interlock component 412 may enable battery monitoring component 408 when battery pack 224 is installed in electric aircraft. In this non-limiting example, a mechanical and/or electrical interlock component disposed in or on battery pack 224 may be actuated when battery pack is installed in electric aircraft. Specifically, and in a non-limiting embodiment, a latching system used to secure battery pack 224 is engaged around a portion of battery pack 224, the latching system may actuate a mechanical interlock component, or complete the circuit of an electrical interlock component to thus enable battery monitoring component 408. Additionally, or alternatively, when installed in electric aircraft, interlock component 412 may enter first mode 444, enabling battery monitoring component 408 and disabling battery management component 404. In another non-limiting example, interlock component 412 enters second mode 448 and thus enables battery management component 404 when the battery is uninstalled from the electric aircraft. Interlock component 412 may enter second mode 448, enabling battery management component 404 during charging of battery pack 224. Interlock component 412 may enter second mode 448, enabling battery management component 404 during testing of battery pack 224. In a non-limiting embodiment, battery monitoring component 408 is enabled by interlock component 412 when battery pack is installed in electric aircraft, and, thus, when electric aircraft is in flight mode. In a non-limiting embodiment, interlock component 412 may be a combinatorial and/or sequential logic circuit. In another non-limiting embodiment, interlock component 412 may include a finite state machine. In some cases, interlock component 412 may include an analog circuit or a processor. The processor may include any processor described in this disclosure. It would follow to one of ordinary skill in the art, upon reviewing the entirety of this disclosure, that when battery pack 224 is uninstalled from electric aircraft, battery management component 404 is enabled when battery pack is offboard of electric aircraft. In other words, faults detected in flight can only be detected and displayed to a user, wherein the discretion of the user is used to mitigate faults, as opposed to offboard electric aircraft when battery management system can mitigate risks without user intervention, in a non-limiting example.

With continued reference to FIG. 4, battery management and monitoring system may include battery management system head unit (BMSHU) 452 configured to electronically communicate with a controller. BMSHU 452 may be consistent with any communicatively coupled electronic component described in this disclosure. The controller may be any circuit, computing device, or combination of electronics and power electronics consistent with this disclosure.

Figure 5:
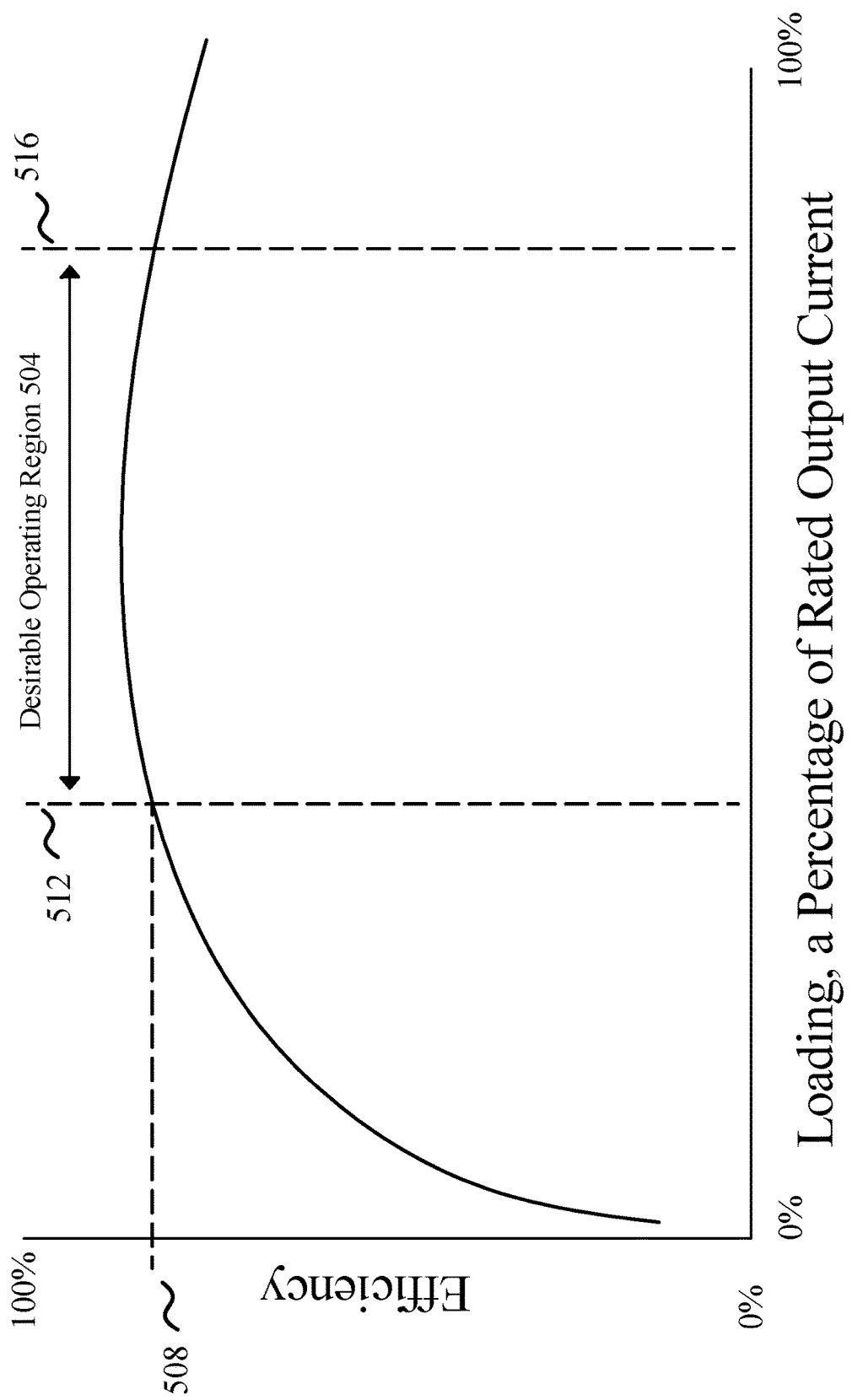
FIG. 5 is a graph of the loading vs. efficiency for an electric power converter.

FIG. 5 is a graph of the efficiency of an electric power converter 116 plotted against the loading (output current as a percentage of output current). FIG. 5 shows that the electric power converter 116 has a desirable operating region 504 at which point electric power converter 116 is at or near its peak efficiency. In this case, in some embodiments, "near" may be within 10% of the electric power converter's 116 peak efficiency. In other embodiments, "near" may be within 20% of the electric power converter's 116 peak efficiency. Alternatively, in some embodiments, desirable operating region 504 may be defined by threshold efficiency 508. In this case, loadings where electric power converter 116 functions above threshold efficiency 508 are part of the desirable operating region 504. Desirable operating region is bounded on the lower end by a lower current threshold 512 and on the upper end by an upper current threshold 516. When the loading of electric power converter 116 falls below lower current threshold 512, electric power converter controller 124 may disable an electric power converter 116 such that the loading falls within desirable operating region 504. In some embodiments, electric power converter controller 124 may disable more than one electric power converter 116 such that the loading falls within desirable operating region 504. When the loading of electric power converter 116 exceeds upper current threshold 516, electric power converter controller 124 may enable an electric power converter 116 such that the loading falls within desirable operating region 504. In some embodiments, electric power converter controller 124 may enable more than one electric power converter 116 such that the loading falls within desirable operating region 504.

Figure 6:
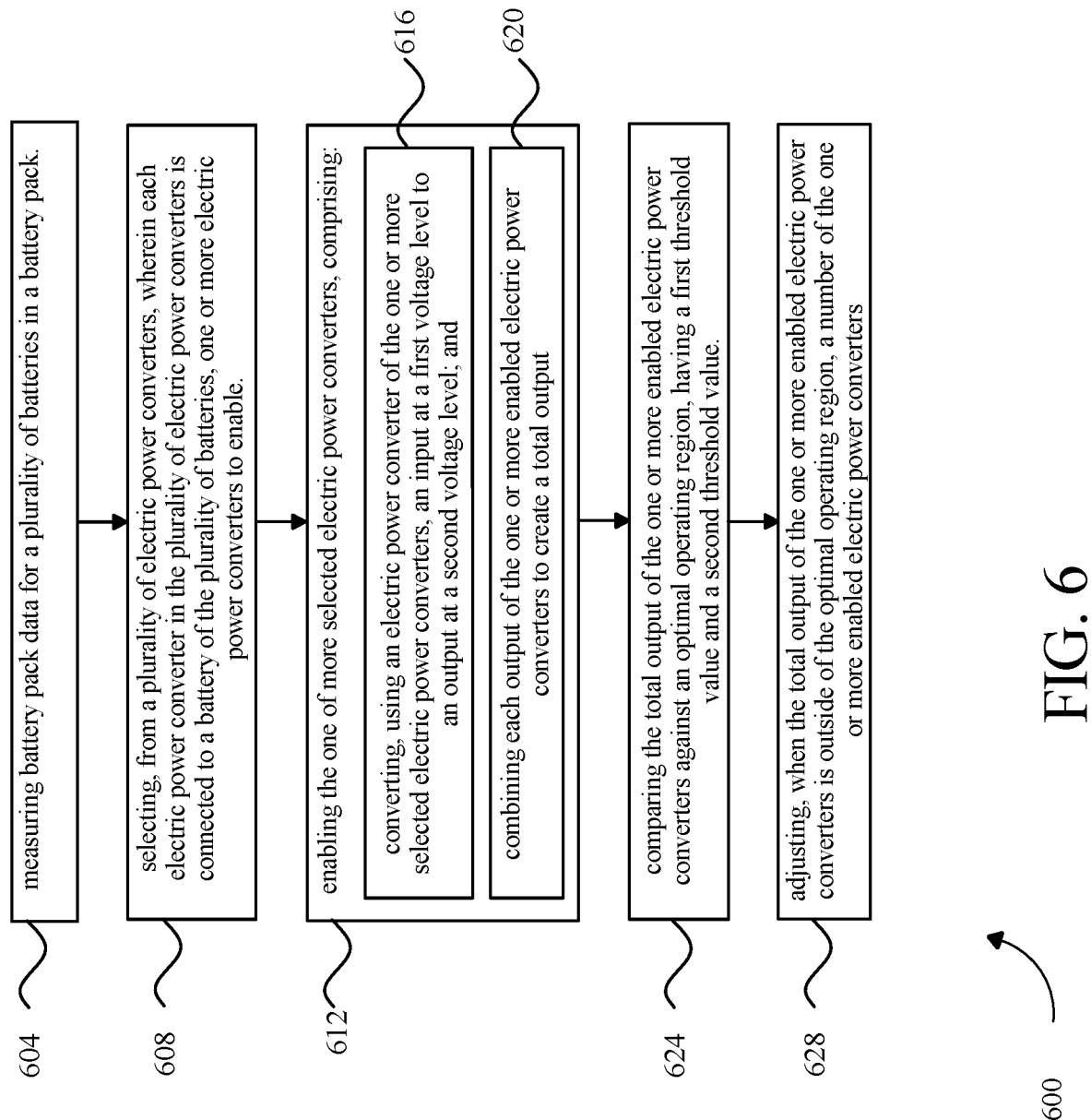
FIG. 6 is a diagrammatic representation of a method for aircraft power management and distribution.

FIG. 6 is a flowchart of method for aircraft power management and distribution 600. Method 600 includes a step 604 of measuring batter pack data for a plurality of batteries in a battery pack. Battery pack data can be any battery pack data described in this disclosure. The plurality of batteries can be any plurality of batteries described in this disclosure. Method 600 also includes step 608 of selecting, from a plurality of electric power converters, wherein each electric power converter in the plurality of electric power converters is connected to a battery of the plurality of batteries, one or more electric power converters to enable. Electric power converters can be any electric power converters in this disclosure. Step 612 entails enabling the one of more selected electric power converters and includes at least two sub-steps, including step 616 and step 620. Step 616 includes converting, using an electric power converter of the one or more selected electric power converters, an input at a first voltage level to an output at a second voltage level. Step 620 includes combining each output of the one or more enabled electric power converters to create a total output. Method 600 also includes step 624 of comparing the total output of the one or more enabled electric power converters against an optimal operating region, having a first threshold value and a second threshold value. optimal operating region can be any optimal operating region disclosed in this disclosure. first and second threshold value can be any first and second threshold value disclosed in this disclosure. Method 600 also includes step 628 of adjusting, when the total output of the one or more enabled electric power converters is outside of the optimal operating region, a number of the one or more enabled electric power converters.

In some non-limiting embodiments, method 600 may also include a step of adjusting an interlock component, wherein the interlock component has a first mode and second mode. Interlock component may be consistent with any interlock component disclosed in this disclosure. This step may, in some embodiments, include the further sub-steps of enabling the battery monitoring component and disabling the battery management component when in the first mode and enabling the battery management component and disabling the battery monitoring component when in the second mode.

In some non-limiting embodiments, method 600 may also include a step of enabling the battery monitoring component when the battery pack is installed in an electric aircraft. In some non-limiting embodiments, method 600 may also include a step of enabling the battery management component when the battery pack is uninstalled from the electric aircraft. In some non-limiting embodiments of method 600, step 628 may further include a sub-step of increasing the number of the one or more enabled electric power converters when the total output of the one or more enabled electric power converters exceeds the second threshold value. In some non-limiting embodiments of method 600, step 628 may further include a sub-step of decreasing the number of the one or more enabled electric power converters when the total output of the one or more enabled electric power converters does not exceed the first threshold value. First threshold value and second threshold value may be consistent with any first threshold value and second threshold value disclosed as part of this disclosure.

In some non-limiting embodiments, method 600 may further include a step of estimating a charge state of each of the plurality of batteries based on a current output of the respective electric power converter. In some non-limiting embodiments, method 600 may further include a step of determining an amount of charge withdrawn from the plurality of batteries based on the current output of the respective electric power converter. In some non-limiting embodiments, method 600 may further include a step of determining an amount of time that each of the plurality of electric power converters is enabled. In some non-limiting embodiments, method 600 may further include a step of rotating through the plurality of electric power converters so that each of the electric power converters is enabled for approximately an equal length of time. In some non-limiting embodiments, method 600 may further include the steps of detecting, as a function of the plurality of battery pack data, a first fault in the battery pack; and detecting, as a function of the plurality of battery pack data, a second fault in the battery pack. In some non-limiting embodiments, method 600 may further include a step of producing a first fault detection response notifying a user of the first fault in the battery pack. The first fault detection response may be consistent with any first fault detection response disclosed in this disclosure. In some non-limiting embodiments, method 600 may further include a step of producing a second fault detection response, wherein the second fault detection response is configured to mitigate the second fault in the battery pack. Second fault detection response may be consistent with any second fault detection response disclosed in this disclosure.

Figure 7:
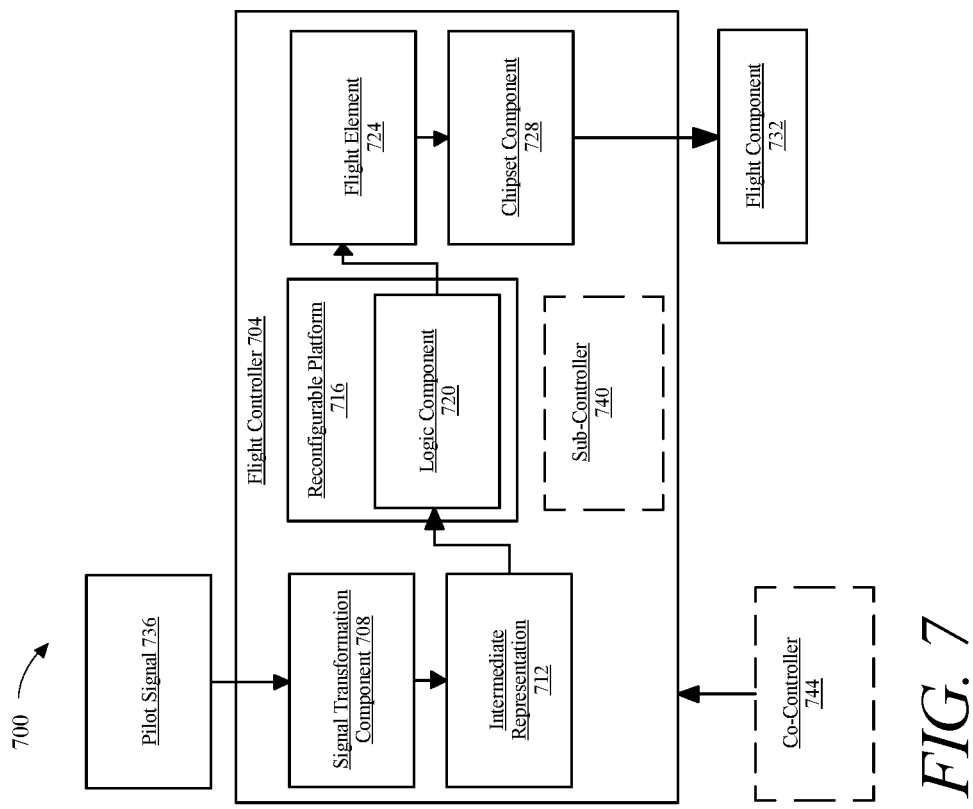
FIG. 7 is a block diagram of an exemplary flight controller.

Now, referring to FIG. 7, in some embodiments, controller 112 may be incorporated into a flight controller. Alternatively, some of the components of controller 112 may be incorporated into a flight controller. An exemplary embodiment 700 of a flight controller 704 is illustrated. As used in this disclosure a "flight controller" is a computing device of a plurality of computing devices dedicated to data storage, security, distribution of traffic for load balancing, and flight instruction. Flight controller 704 may include and/or communicate with any computing device as described in this disclosure, including without limitation a microcontroller, microprocessor, digital signal processor (DSP) and/or system on a chip (SoC) as described in this disclosure. Further, flight controller 704 may include a single computing device operating independently, or may include two or more computing device operating in concert, in parallel, sequentially or the like; two or more computing devices may be included together in a single computing device or in two or more computing devices. In embodiments, flight controller 704 may be installed in an aircraft, may control the aircraft remotely, and/or may include an element installed in the aircraft and a remote element in communication therewith.

In an embodiment, and still referring to FIG. 7, flight controller 704 may include a signal transformation component 708. As used in this disclosure a "signal transformation component" is a component that transforms and/or converts a first signal to a second signal, wherein a signal may include one or more digital and/or analog signals. For example, and without limitation, signal transformation component 708 may be configured to perform one or more operations such as preprocessing, lexical analysis, parsing, semantic analysis, and the like thereof. In an embodiment, and without limitation, signal transformation component 708 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 708 may include transforming one or more low-level languages such as, but not limited to, machine languages and/or assembly languages. For example, and without limitation, signal transformation component 708 may include transforming a binary language signal to an assembly language signal. In an embodiment, and without limitation, signal transformation component 708 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 7, signal transformation component 708 may be configured to optimize an intermediate representation 712. As used in this disclosure an "intermediate representation" is a data structure and/or code that represents the input signal. Signal transformation component 708 may optimize intermediate representation as a function of a data-flow analysis, dependence analysis, alias analysis, pointer analysis, escape analysis, and the like thereof. In an embodiment, and without limitation, signal transformation component 708 may optimize intermediate representation 712 as a function of one or more inline expansions, dead code eliminations, constant propagation, loop transformations, and/or automatic parallelization functions. In another embodiment, signal transformation component 708 may optimize intermediate representation as a function of a machine dependent optimization such as a peephole optimization, wherein a peephole optimization may rewrite short sequences of code into more efficient sequences of code. Signal transformation component 708 may optimize intermediate representation to generate an output language, wherein an "output language," as used herein, is the native machine language of flight controller 704. For example, and without limitation, native machine language may include one or more binary and/or numerical languages.

In an embodiment, and without limitation, signal transformation component 708 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 7, flight controller 704 may include a reconfigurable hardware platform 716. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 716 may be reconfigured to enact any algorithm and/or algorithm selection process received from another computing device and/or created using machine-learning processes.

Still referring to FIG. 7, reconfigurable hardware platform 716 may include a logic component 720. As used in this disclosure a "logic component" is a component that executes instructions on output language. For example, and without limitation, logic component may perform basic arithmetic, logic, controlling, input/output operations, and the like thereof. Logic component 720 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 720 may be organized according to Von Neumann and/or Harvard architecture as a non-limiting example. Logic component 720 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 720 may include one or more integrated circuit microprocessors, which may contain one or more central processing units, central processors, and/or main processors, on a single metal-oxide-semiconductor chip. Logic component 720 may be configured to execute a sequence of stored instructions to be performed on the output language and/or intermediate representation 712. Logic component 720 may be configured to fetch and/or retrieve the instruction from a memory cache, wherein a "memory cache," as used in this disclosure, is a stored instruction set on flight controller 704. Logic component 720 may be configured to decode the instruction retrieved from the memory cache to opcodes and/or operands. Logic component 720 may be configured to execute the instruction on intermediate representation 712 and/or output language. For example, and without limitation, logic component 720 may be configured to execute an addition operation on intermediate representation 712 and/or output language.

In an embodiment, and without limitation, logic component 720 may be configured to calculate a flight element 724. As used in this disclosure a "flight element" is an element of datum denoting a relative status of aircraft. For example, and without limitation, flight element 724 may denote one or more torques, thrusts, airspeed velocities, forces, altitudes, groundspeed velocities, directions during flight, directions facing, forces, orientations, and the like thereof. For example, and without limitation, flight element 724 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 724 may denote that aircraft is following a flight path accurately and/or sufficiently.

Still referring to FIG. 7, flight controller 704 may include a chipset component 728. As used in this disclosure a "chipset component" is a component that manages data flow. In an embodiment, and without limitation, chipset component 728 may include a northbridge data flow path, wherein the northbridge dataflow path may manage data flow from logic component 720 to a high-speed device and/or component, such as a RAM, graphics controller, and the like thereof. In another embodiment, and without limitation, chipset component 728 may include a southbridge data flow path, wherein the southbridge dataflow path may manage data flow from logic component 720 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 728 may manage data flow between logic component 720, memory cache, and a flight component 732. As used in this disclosure a "flight component" is a portion of an aircraft that can be moved or adjusted to affect one or more flight elements. For example, flight component 732 may include a component used to affect the aircrafts' roll and pitch which may comprise one or more ailerons. As a further example, flight component 732 may include a rudder to control yaw of an aircraft. In an embodiment, chipset component 728 may be configured to communicate with a plurality of flight components as a function of flight element 724. For example, and without limitation, chipset component 728 may transmit to an aircraft rotor to reduce torque of a first lift propulsor and increase the forward thrust produced by a pusher component to perform a flight maneuver.

In an embodiment, and still referring to FIG. 7, flight controller 704 may be configured generate an autonomous function. As used in this disclosure an "autonomous function" is a mode and/or function of flight controller 704 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 724. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 704 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 704 will control the ailerons and/or rudders. As used in this disclosure "non-autonomous mode" is a mode that denotes a pilot will control aircraft and/or maneuvers of aircraft in its entirety.

In an embodiment, and still referring to FIG. 7, flight controller 704 may generate autonomous function as a function of an autonomous machine-learning model. As used in this disclosure an "autonomous machine-learning model" is a machine-learning model to produce an autonomous function output given flight element 724 and a pilot signal 736 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 736 may denote that a pilot is controlling and/or maneuvering ailerons, wherein the pilot is not in control of the rudders and/or propulsors. In an embodiment, pilot signal 736 may include an implicit signal and/or an explicit signal. For example, and without limitation, pilot signal 736 may include an explicit signal, wherein the pilot explicitly states there is a lack of control and/or desire for autonomous function. As a further non-limiting example, pilot signal 736 may include an explicit signal directing flight controller 704 to control and/or maintain a portion of aircraft, a portion of the flight plan, the entire aircraft, and/or the entire flight plan. As a further non-limiting example, pilot signal 736 may include an implicit signal, wherein flight controller 704 detects a lack of control such as by a malfunction, torque alteration, flight path deviation, and the like thereof. In an embodiment, and without limitation, pilot signal 736 may include one or more explicit signals to reduce torque, and/or one or more implicit signals that torque may be reduced due to reduction of airspeed velocity.

In an embodiment, and without limitation, pilot signal 736 may include one or more local and/or global signals. For example, and without limitation, pilot signal 736 may include a local signal that is transmitted by a pilot and/or crew member. As a further non-limiting example, pilot signal 736 may include a global signal that is transmitted by air traffic control and/or one or more remote users that are in communication with the pilot of aircraft. In an embodiment, pilot signal 736 may be received as a function of a tri-state bus and/or multiplexor that denotes an explicit pilot signal should be transmitted prior to any implicit or global pilot signal.

Still referring to FIG. 7, autonomous machine-learning model may include one or more autonomous machine-learning processes such as supervised, unsupervised, or reinforcement machine-learning processes that flight controller 704 and/or a remote device may or may not use in the generation of autonomous function. As used in this disclosure "remote device" is an external device to flight controller 704. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 7, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 704 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 7, flight controller 704 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 704. Remote device and/or FPGA may transmit a signal, bit, datum, or parameter to flight controller 704 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 704 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 7, flight controller 704 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 7, flight controller 704 may include, but is not limited to, for example, a cluster of flight controllers in a first location and a second flight controller or cluster of flight controllers in a second location. Flight controller 704 may include one or more flight controllers dedicated to data storage, security, distribution of traffic for load balancing, and the like. Flight controller 704 may be configured to distribute one or more computing tasks as described below across a plurality of flight controllers, which may operate in parallel, in series, redundantly, or in any other manner used for distribution of tasks or memory between computing devices. For example, and without limitation, flight controller 704 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Mass., USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 7, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 732. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 7, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 704. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 712 and/or output language from logic component 720, wherein output language may include one or more analog-to-digital conversions, low bit rate transmissions, message encryptions, digital signals, binary signals, logic signals, analog signals, and the like thereof described above in detail.

Still referring to FIG. 7, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 7, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 7, flight controller 704 may also be implemented using a "shared nothing" architecture in which data is cached at the worker, in an embodiment, this may enable scalability of aircraft and/or computing device. Flight controller 704 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 7, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 7, flight controller may include a sub-controller 740. As used in this disclosure a "sub-controller" is a controller and/or component that is part of a distributed controller as described above; for instance, flight controller 704 may be and/or include a distributed flight controller made up of one or more sub-controllers. For example, and without limitation, sub-controller 740 may include any controllers and/or components thereof that are similar to distributed flight controller and/or flight controller as described above. Sub-controller 740 may include any component of any flight controller as described above. Sub-controller 740 may be implemented in any manner suitable for implementation of a flight controller as described above. As a further non-limiting example, sub-controller 740 may include one or more processors, logic components and/or computing devices capable of receiving, processing, and/or transmitting data across the distributed flight controller as described above. As a further non-limiting example, sub-controller 740 may include a controller that receives a signal from a first flight controller and/or first distributed flight controller component and transmits the signal to a plurality of additional sub-controllers and/or flight components.

Still referring to FIG. 7, flight controller may include a co-controller 744. As used in this disclosure a "co-controller" is a controller and/or component that joins flight controller 704 as components and/or nodes of a distributer flight controller as described above. For example, and without limitation, co-controller 744 may include one or more controllers and/or components that are similar to flight controller 704. As a further non-limiting example, co-controller 744 may include any controller and/or component that joins flight controller 704 to distributer flight controller. As a further non-limiting example, co-controller 744 may include one or more processors, logic components and/or computing devices capable of receiving, processing, and/or transmitting data to and/or from flight controller 704 to distributed flight control system. Co-controller 744 may include any component of any flight controller as described above. Co-controller 744 may be implemented in any manner suitable for implementation of a flight controller as described above.

In an embodiment, and with continued reference to FIG. 7, flight controller 704 may be designed and/or configured to perform any method, method step, or sequence of method steps in any embodiment described in this disclosure, in any order and with any degree of repetition. For instance, flight controller 704 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 8:
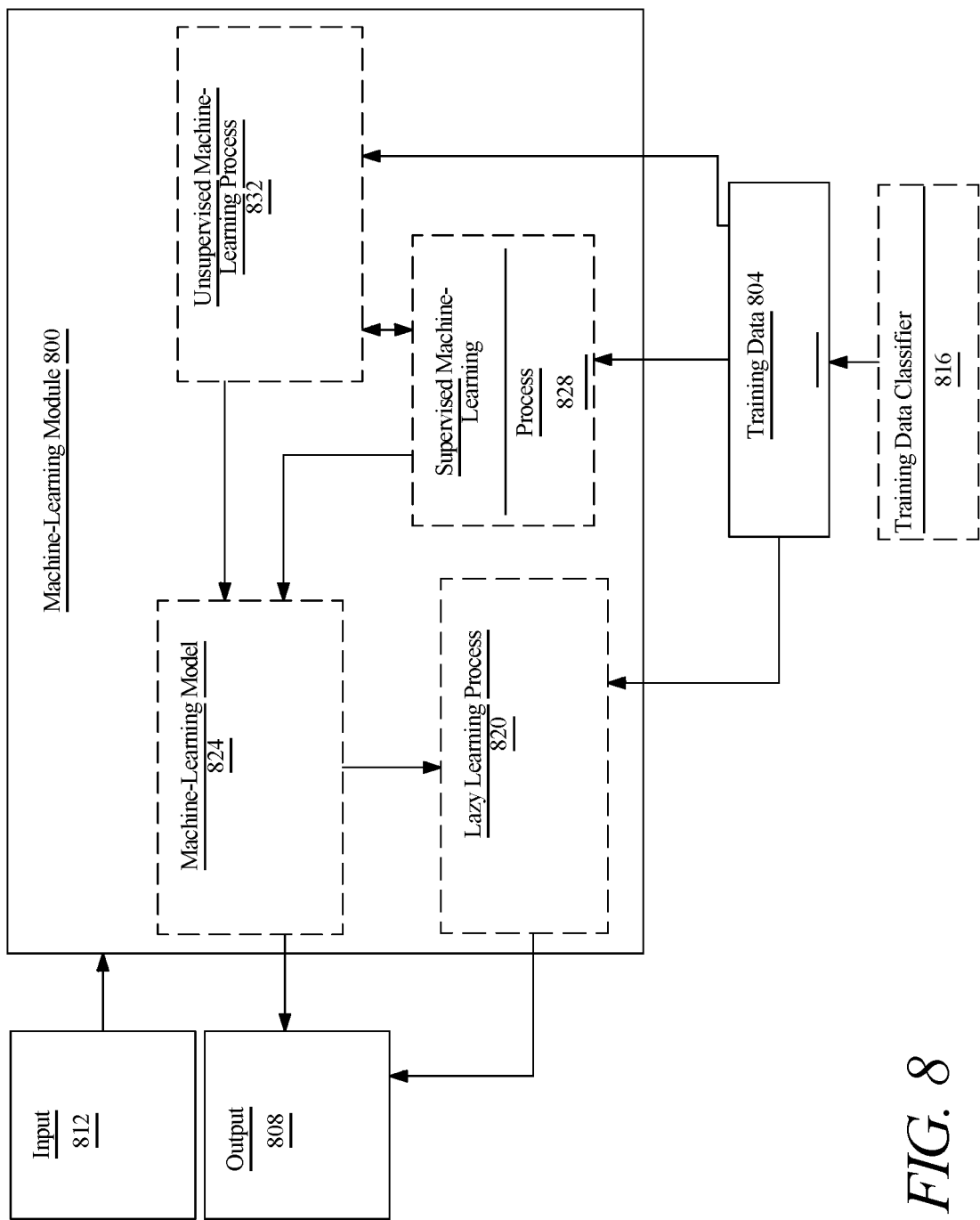
FIG. 8 is a block diagram of a machine-learning module that may perform one or more machine-learning processes as described in this disclosure.

Referring now to FIG. 8, an exemplary embodiment of a machine-learning module 800 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 804 to generate an algorithm that will be performed by a computing device/module to produce outputs 808 given data provided as inputs 812; this is in contrast to a non-machine learning software program where the commands to be executed are determined in advance by a user and written in a programming language.

Still referring to FIG. 8, "training data," as used herein, is data containing correlations that a machine-learning process may use to model relationships between two or more categories of data elements. For instance, and without limitation, training data 804 may include a plurality of data entries, each entry representing a set of data elements that were recorded, received, and/or generated together; data elements may be correlated by shared existence in a given data entry, by proximity in a given data entry, or the like. Multiple data entries in training data 804 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 804 according to various correlations; correlations may indicate causative and/or predictive links between categories of data elements, which may be modeled as relationships such as mathematical relationships by machine-learning processes as described in further detail below. Training data 804 may be formatted and/or organized by categories of data elements, for instance by associating data elements with one or more descriptors corresponding to categories of data elements. As a non-limiting example, training data 804 may include data entered in standardized forms by persons or processes, such that entry of a given data element in a given field in a form may be mapped to one or more descriptors of categories. Elements in training data 804 may be linked to descriptors of categories by tags, tokens, or other data elements; for instance, and without limitation, training data 804 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 8, training data 804 may include one or more elements that are not categorized; that is, training data 804 may not be formatted or contain descriptors for some elements of data. Machine-learning algorithms and/or other processes may sort training data 804 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 804 to be made applicable for two or more distinct machine-learning algorithms as described in further detail below. Training data 804 used by machine-learning module 800 may correlate any input data as described in this disclosure to any output data as described in this disclosure. As a non-limiting illustrative example flight elements and/or pilot signals may be inputs, wherein an output may be an autonomous function.

Further referring to FIG. 8, training data may be filtered, sorted, and/or selected using one or more supervised and/or unsupervised machine-learning processes and/or models as described in further detail below; such models may include without limitation a training data classifier 816. Training data classifier 816 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 800 may generate a classifier using a classification algorithm, defined as a processes whereby a computing device and/or any module and/or component operating thereon derives a classifier from training data 804. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to sub-categories of flight elements such as torques, forces, thrusts, directions, and the like thereof.

Still referring to FIG. 8, machine-learning module 800 may be configured to perform a lazy-learning process 820 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 804. Heuristic may include selecting some number of highest-ranking associations and/or training data 804 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 8, machine-learning processes as described in this disclosure may be used to generate machine-learning models 824. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 824 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 824 may be generated by creating an artificial neural network, such as a convolutional neural network comprising an input layer of nodes, one or more intermediate layers, and an output layer of nodes. Connections between nodes may be created via the process of "training" the network, in which elements from a training data 804 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 8, machine-learning algorithms may include at least a supervised machine-learning process 828. At least a supervised machine-learning process 828, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 804. Persons skilled in the art, upon reviewing the entirety of this disclosure, will be aware of various possible variations of at least a supervised machine-learning process 828 that may be used to determine relation between inputs and outputs. Supervised machine-learning processes may include classification algorithms as defined above.

Further referring to FIG. 8, machine learning processes may include at least an unsupervised machine-learning processes 832. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 8, machine-learning module 800 may be designed and configured to create a machine-learning model 824 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Figure 9:
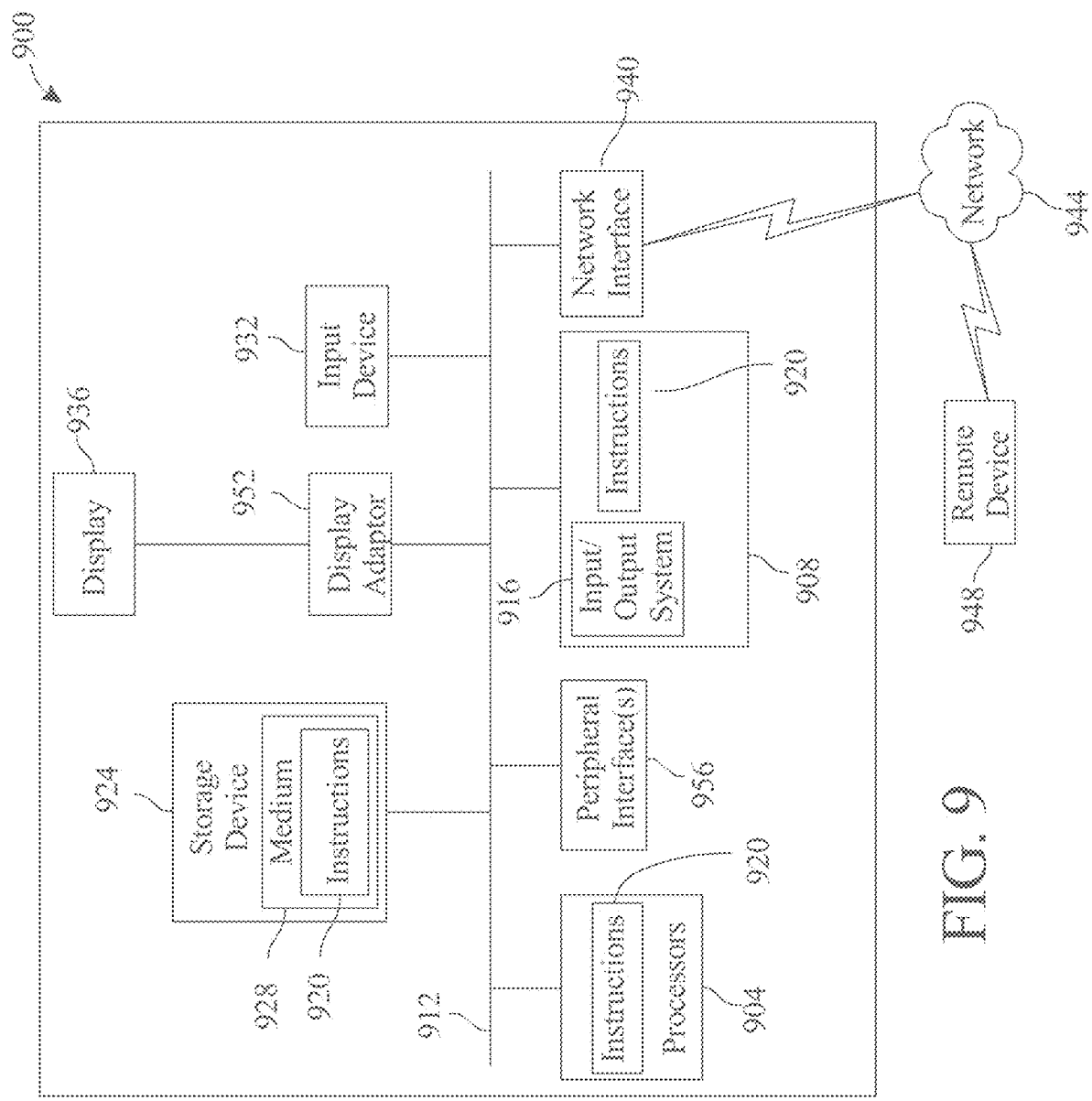
FIG. 9 is a block diagram of a computing system that can be used to implement any one or more of the methodologies disclosed herein and any one or more portions thereof.

Continuing to refer to FIG. 8, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and systems according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for aircraft power management and distribution, comprising:
    a battery pack, the battery pack comprising:
        a plurality of batteries electrically connected together in a series;
        a battery monitoring component, the battery monitoring component configured to measure battery pack data;
        a battery management component;
        an interlock component, having a first mode and a second mode, the interlock component configured to:
            enable the battery monitoring component and disable the battery management component when in the first mode when installed in an electric aircraft; and
            enable the battery management component and disable the battery monitoring component when in the second mode;
            enable the battery monitoring component when the battery pack is installed in an electric aircraft;
            enable the battery management component when the battery pack is uninstalled from the electric aircraft; and
        a plurality of electric power converters, wherein each electric power converter of the plurality of electric power converters is connected to a battery in the plurality of batteries;
    an electric power converter controller, the electric power converter controller configured to:
        control each electric power converter of a plurality of electric power converters;
        select, from the plurality of electric power converters, one or more electric power converters to enable;
        enable the one or more selected electric power converters, wherein:
            an enabled electric power converter converts an input at a first voltage level to an output at a second voltage level; and
            the outputs of the one or more enabled electric power converters are combined to create a total output;
        compare the total output of the one or more enabled electric power converters against an optimal operating region, having a first threshold value and a second threshold value; and
        adjust, when the total output of the one or more enabled electric power converters is outside of the optimal operating region, a number of the one or more enabled electric power converters, wherein adjusting further comprises adjusting as a function of the battery pack data.

2. The system for aircraft power management and distribution of claim 1,
    wherein adjusting the number of the one or more enabled electric power converters comprises:
    increasing the number of the one or more enabled electric power converters when the total output of the one or more enabled electric power converters exceeds the second threshold value.

3. The system for aircraft power management and distribution of claim 1,
    wherein adjusting the number of the one or more enabled electric power converters comprises:
    decreasing the number of the one or more enabled electric power converters when the total output of the one or more enabled electric power converters does not exceed the first threshold value.

4. The system for aircraft power management and distribution of claim 1,
    wherein the electric power converter controller is further configured to:
    estimate a charge state of each of the plurality of batteries based on a current output of the respective electric power converter; and
    determine an amount of charge withdrawn from the plurality of batteries based on the current output of the respective electric power converter.

5. The system for aircraft power management and distribution of claim 1,
    wherein the electric power converter controller is further configured to:
    determine an amount of time that each of the plurality of electric power converters is enabled; and
    rotate through the plurality of electric power converters so that each of the electric power converters is enabled for approximately an equal length of time.

6. The system for aircraft power management and distribution of claim 5,
    wherein the electric power converter controller uses a machine learning algorithm.

7. The system for aircraft power management and distribution of claim 1, further comprising a plurality of flight components, the plurality of flight components receiving the total output.

8. The system for aircraft power management and distribution of claim 1, wherein:
    the battery monitoring component is configured to:
        detect a first fault in the battery pack based on the battery pack data; and
        produce a first fault detection response notifying a user of the first fault in the battery pack; and
    the battery management component is configured to:
        detect a second fault in the battery pack based on the battery pack data; and
        produce a second fault detection response, wherein the second fault detection response is configured to mitigate the second fault in the battery pack.

9. A method for aircraft power management and distribution, comprising:
    measuring, at a battery monitoring component and a battery management component, battery pack data for a plurality of batteries in a battery pack;
    selecting, from a plurality of electric power converters, wherein each electric power converter in the plurality of electric power converters is connected to a battery of the plurality of batteries, one or more electric power converters to enable;

enabling the one of more selected electric power converters, comprising:
- converting, using an electric power converter of the one or more selected electric power converters, an input at a first voltage level to an output at a second voltage level; and
- combining each output of the one or more enabled electric power converters to create a total output;

comparing the total output of the one or more enabled electric power converters against an optimal operating region, having a first threshold value and a second threshold value;

adjusting, when the total output of the one or more enabled electric power converters is outside of the optimal operating region, a number of the one or more enabled electric power converters; and adjusting an interlock component, the interlock component having a first mode and a second mode, comprising:
- enabling the battery monitoring component and disabling the battery management component when in the first mode;
- enabling the battery management component and disabling the battery monitoring component when in the second mode;
- enabling the battery monitoring component when the battery pack is installed in an electric aircraft; and
- enabling the battery management component when the battery pack is uninstalled from the electric aircraft.

10. The method for aircraft power management and distribution of claim 9, wherein adjusting the number of the one or more enabled electric power converters comprises increasing the number of the one or more enabled electric power converters when the total output of the one or more enabled electric power converters exceeds the second threshold value.

11. The method for aircraft power management and distribution of claim 9, wherein adjusting the number of the one or more enabled electric power converters comprises decreasing the number of the one or more enabled electric power converters when the total output of the one or more enabled electric power converters does not exceed the first threshold value.

12. The method for aircraft power management and distribution of claim 9, further comprising:
- estimating a charge state of each of the plurality of batteries based on a current output of the respective electric power converter; and
- determining an amount of charge withdrawn from the plurality of batteries based on the current output of the respective electric power converter.

13. The method for aircraft power management and distribution of claim 12, further comprising:
- determining an amount of time that each of the plurality of electric power converters is enabled; and
- rotating through the plurality of electric power converters so that each of the electric power converters is enabled for approximately an equal length of time.

14. The method for aircraft power management and distribution of claim 9, further comprising:
- detecting, as a function of the plurality of battery pack data, a first fault in the battery pack; and
- detecting, as a function of the plurality of battery pack data, a second fault in the battery pack.

15. The method for aircraft power management and distribution of claim 14, further comprising:
- producing a first fault detection response notifying a user of the first fault in the battery pack; and
- producing a second fault detection response, wherein the second fault detection response is configured to mitigate the second fault in the battery pack.

* * * * *